Figure 1A:
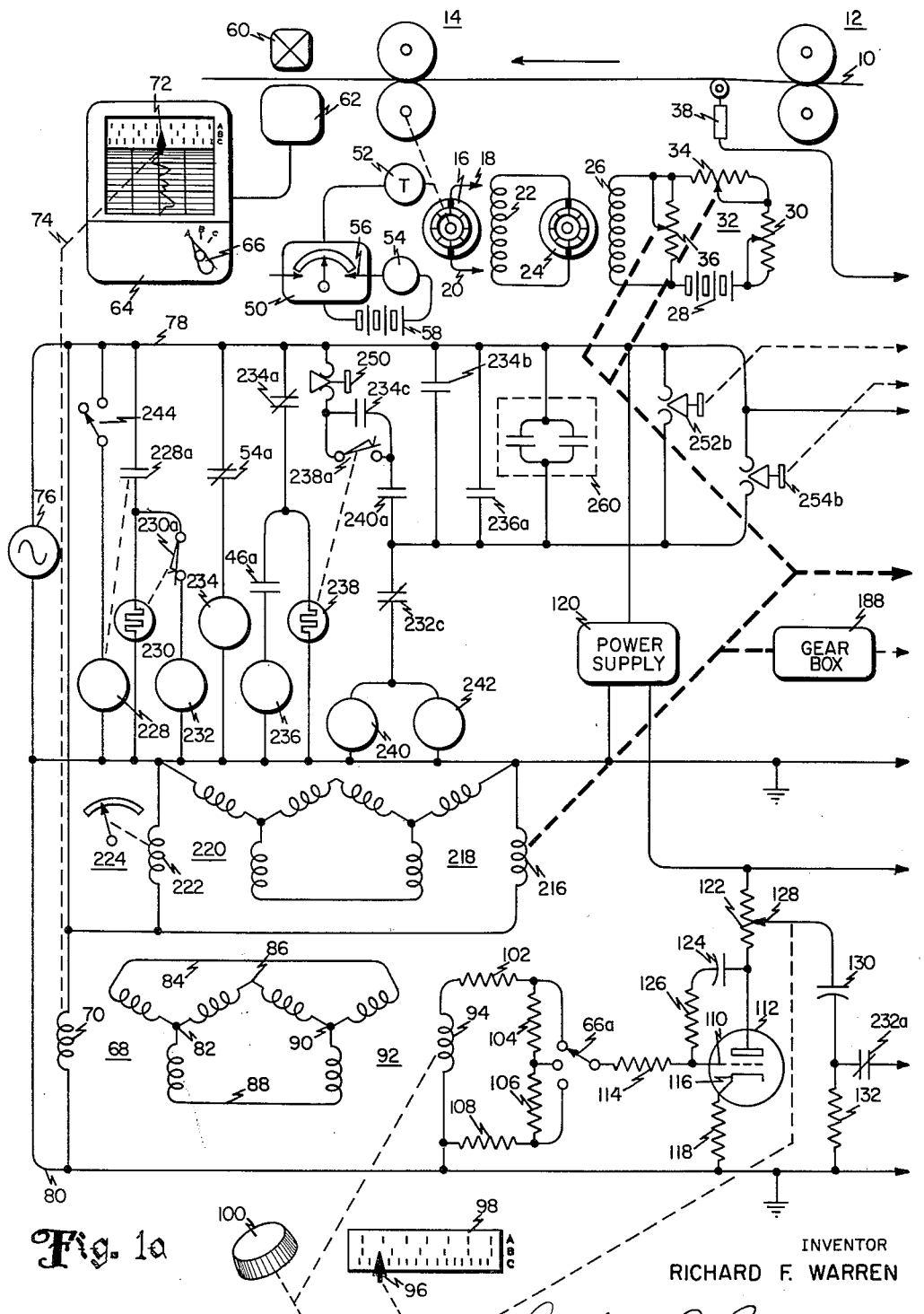

Sept. 12, 1961

R. F. WARREN 2,999,406

CONTROL APPARATUS

Filed May 6, 1957

2 Sheets-Sheet 1

INVENTOR
RICHARD F. WARREN
By Anthony D. Cennamo

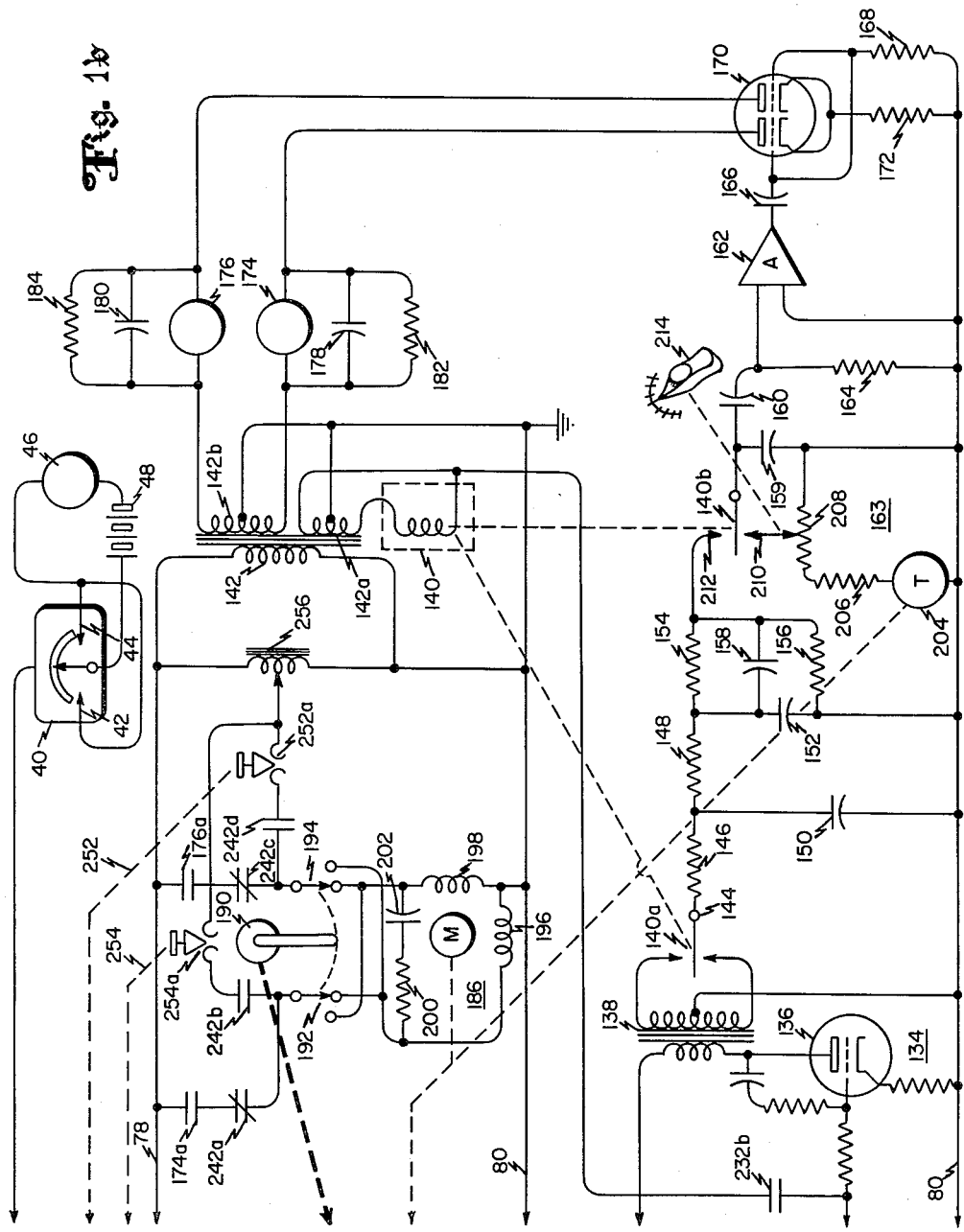

United States Patent Office 2,999,406
Patented Sept. 12, 1961

2,999,406
CONTROL APPARATUS
Richard F. Warren, Columbus, Ohio, assignor to Industrial Nucleonics Corporation
Filed May 6, 1957, Ser. No. 657,434
4 Claims. (Cl. 80—35)

This invention relates to a control system for a rolling mill and like apparatus, and more specifically it relates to a new and improved automatic control system responsive to measurements provided by a nuclear radiation gauge for maintaining a constant cross-sectional dimension of a strip or other elongated body undergoing reduction by regulating the tension applied thereto between stands of the mill.

Automatic control devices for rolling mills, and in particular control systems designed to achieve uniformity of the strip by regulating the tension of the same during reduction, have been known to the art for several decades. However, it is clear that these devices have not been entirely satisfactory, as is evidenced by the fact that such controls are not regularly employed industry-wide, and that many processes of this character are still controlled by manual methods despite the substantial raw material savings which can be effected through really accurate, continuous control of the manufacturing operation and the premium prices commanded in the trade for a prime quality product; in particular a metal product. Some of the difficulties with control systems proposed heretofore have included the necessity for making extensive modifications to expensive capital equipment in order to incorporate the control devices, the high cost of the control equipment, and the lack of a sufficiently accurate continuous measuring device incorporated therewith. They have been difficult and expensive to install, adjust, maintain and operate, and their performance has suffered from undue dependence on transient errors arising out of the random and cyclical variations characteristic of these processes.

It is accordingly an object of this invention to provide a new and improved control system which overcomes these and other disadvantages of prior apparatus.

It is a specific object to provide a new and improved automatic control system responsive to measurements provided by a nuclear radiation gauge for maintaining a constant desired weight per unit area or length of an elongated body undergoing reduction by regulating the tension applied thereto between a pair of machine elements in tractive engagement with said body.

It is a further object to provide such a control system which is characterized by greatly improved accuracy and reliability.

It is a still further object to provide a controller whereby corrective adjustments are performed in accordance with the time integral of the error signal, rather than being unduly responsive to large transient deviations arising therein.

It is also an object to provide such a control system which is readily adapted for installation on a great variety of existing mills with little or no modification thereof.

It is another object to provide a control system which is relatively inexpensive to build, easy to install, simple to operate, and which requires a minimum of adjustment and maintenance.

Further objects and advantages of this invention will become apparent in view of the following detailed description and appended drawings.

In the drawings, when FIGURE 1a is placed alongside FIGURE 1b there is shown a complete schematic diagram of the apparatus involved.

Referring to the drawing, there is illustrated a material strip 10 undergoing reduction through a pair of rolling mill stands 12 and 14 which subject the strip to a squeezing action between each pair of rolls while simultaneously exerting a tension or drafting force on the strip between the two stands of rolls. The degree of reduction is dependent on both the pressure applied on the strip at the nips of the two pairs of rolls and the amount of longitudinal tension, which is in turn dependent on the difference in peripheral speed between the faster turning rolls 14 and the rolls of the preceding stand 12.

The drive mechanism for the roll stand 12 is not shown. Stand 14 is illustrated as being driven by a motor 16 which receives power from a pair of bus leads 18 and 20 and which has a field winding 22 energized by the motor field exciter generator 24. The generator 24 has a field winding 26 which is energized from a D.C. voltage source represented by the battery 28 through a coarse voltage control rheostat 30 and through a vernier rheostat 32 comprising a series-parallel arrangement of potentiometers 34 and 36. The motor control system herein depicted obviously contains only a bare minimum of essential features abstracted from a common type thereof for the purpose of illustrating the use of the present invention, inasmuch as the circuits actually used are of various types and may often be quite complex.

For purposes of controlling the mill, the same is normally provided with a tensiometer 38 coupled to a tension meter 40 for indicating the tension on the strip 10 between the stands of the mill. The tension meter may be equipped with a device such as a pair of limit contacts 42 and 44 which energize a tension relay 46 from a power source 48 in the event the tension on the strip becomes too high or too low. Certain contacts 46a of relay 46 are used to control the operation of a further tension relay 236 incorporated in the relay networks of the controller of the present invention in a manner to be described hereinafter, so as to prevent the action of the controller from exceeding a tension limit, as might occur, for example, if the mill screwdown adjustments were improperly set. The speed of the mill stand 14 may be indicated by a meter 50 responsive to a tachometer generator 52. The speed indicator is utilized to actuate a relay 54 by some means such as a limit contact 56 thereon which closes when the mill stand 14 reaches a predetermined speed, thus energizing relay 54 from a voltage source 58.

In accordance with this invention, an inspection head containing a radioactive source 60 and a radiation detector 62 is located near the output side of the mill stand 14 in order to measure the thickness of the strip 10 issuing therefrom. The inspection head containing the source and detector may be of the type which is described in a co-pending application Serial No. 581,453, filed April 30, 1956, by Bernard C. Holben, now U.S. Patent 2,967,242. The detector 62 is coupled to an indicating and recording device 64 which is calibrated to indicate the thickness of the strip on the applicable one of a plurality of range scales illustrated as A, B and C, which are selectable, according to the range of thickness values which includes the production specification thickness of the output strip, by means of a range selector switch 66. The measuring instrument is preferably constructed in accordance with the circuitry disclosed in U.S. Patent No. 2,790,945, issued April 30, 1957, to Henry R. Chope.

The recording device 64 has mounted therein a synchro control transmitter 68 whose rotor 70 is mechanically coupled to the measuring indicator 72 as is shown by the dotted line 74. The rotor 70 is energized from the conventional 115 v. A.C. voltage source 76 which provides power on lines 78 and 80 of the controller. The stator 82 of the control transmitter is connected by lines 84, 86 and 88 to the stator 90 of a remotely located control transformer 92. The rotor 94 of the control transformer is coupled to a target indicator 96 having associated scales 98 corresponding to those in the recorder 64. The target indicator 96 is also coupled to a target setting controll knob 100 whereby the operator may set the indicator to the thickness at which the controller is to maintain the strip 10 issuing from the output mill stand 14. The synchros 68 and 92 are so oriented that there is no output voltage from the control transformer 92 when the indicator 72 of the recorder 64 is located at the same position relative to the recorder scale as the target indicator 96 is positioned relative to the target scale 98. However, if the indicator 72 deviates from the value indicated by the target pointer 96, the 60 c.p.s. error signal voltage appearing across the terminals of the rotor 94 will have a magnitude proportional to the magnitude of the deviation and one of two directly opposite phases depending on the direction of the error.

The error voltage output of the control transformer 92 is applied across a voltage divider network comprising resistors 102, 104, 106 and 108, and having a plurality of taps thereon which are selectable by a switch 66a. The switch 66a is operated in conjunction with the range switch 66 on the control panel of the indicating and recording device 64, and may be arranged to operate the latter switch by remote control. The switch 66a and its associated voltage divider is provided as part of a system for compensating the error signal for variations in the span of the thickness ranges presented on the recorder. For example scale A may encompass the range of 16–21 mils; range B, 20–30 mils; and range C, 25–45 mils, so that the three scales respectively represent spans of 5, 10 and 20 mils (thousandths of an inch). Accordingly compensation is necessary to present a constant voltage per percent error as an input to the controller. In the compensation system, the voltage divider 102—108 and the switch 66a provide a coarse measure of compensation or "brackets" within which a more exact set point is selected in a manner described hereinafter.

The amplitude bracketed signal is applied to the grid 110 of an amplifier tube 112 through an input resistor 114. This input is taken with respect to line 80, the grounded common line of the power source 76, to which the cathode 116 of the tube 112 is connected through resistor 118. The plate voltage for tube 112 is furnished by a D.C. power supply 120 energized by the power source 76. The plate load is a potentiometer 122. Distortion of the signal in the amplifier output is minimized by negative feedback of the A.C. component of the plate voltage coupled back to the grid 110 through capacitor 124 and resistor 126. The variable tap 128 of potentiometer 122 is mechanically coupled to the target indicator 96 and the associated control knob 100, so that the final span compensation within a range or amplitude bracket is effected in an automatic manner when the target setting is made by the operator. Accordingly the A.C. component of the voltage derived from the tap 128 of potentiometer 122 which is transmitted through capacitor 130 and which appears across resistor 132 is a signal having a constant amplitude per percent error in the thickness of the strip 10 passing between the source 60 and the detector 62, for any selected measuring range and specific target thickness selected therein.

The compensated error signal across resistor 132 is connected through a set of relay contacts 232a to another amplifier stage 134 similar to that utilizing tube 112, except that the plate circuit of tube 136 contains a transformer 138 whereby the single-ended signal when amplified is converted in the center-tapped output of the transformer to a double-ended signal suitable for demodulation by a set of chopper contacts 140a into a D.C. signal. The chopper 140 is driven by the low voltage secondary winding 142a of a transformer 142 which is energized from the 115 v. A.C. power source 76 across lines 78 and 80. The D.C. error voltage appearing between the point 144 and the grounded common line 80 is filtered by the combination of resistors 146 and 148 and capacitors 150 and 152. Because of the electrical delays in the mill motor field circuits and the mechanical inertia of the armature and other dynamic elements of the mill, the error signal is passed through a phase lead circuit comprising a pair of resistors 154 and 156 and capacitor 158 whose function is more fully described hereinafter.

The processed error signal appearing across resistor 156 is modulated to an A.C. signal by contacts 140b of the chopper 140 and coupled through capacitor 160 to the input of an A.C. servo amplifier 162. The A.C. signal, which may be modified by the tachometer feedback device 163 in a manner to be hereinafter described, appears across resistor 164 at the input of the servo amplifier. The output of amplifiers 162 is coupled through capacitor 166 to the input of a phase demodulator stage where it appears across resistor 168 and is impressed on both grids of a twin triode tube 170 having a common cathode resistor 172. Plate voltage for the output stage 170 is supplied by the high voltage secondary winding 142b of transformer 142, said winding having a center tap connected to the grounded common line 80. Each plate circuit of tube 170 has a relay coil 174 and 176 in series therewith. One stage of amplifier 162 contains a suitable phase shift network of conventional design incorporated therein, whereby the common signal on both grids of the tube 170 will be in phase with the voltage applied to one plate of tube 170 and 180 degrees out of phase with the other, depending on whether the D.C. signal across resistor 156 is positive or negative with respect to line 80. Accordingly that half of the tube 170 having its grid and plate voltages in phase will conduct current on each half cycle of the supply voltage, energizing its respective plate relay 174 or 176. Operation of these relays is stabilized in a conventional manner by capacitors 178 and 180 and resistors 182 and 184 across the relay coils. Contacts 174a and 176a of these relays are used to control the application of power to the servo motor 186.

The servo motor 186, when operating, repositions the vernier rheostat 32, thus increasing or decreasing the speed of the output mill stand 14 in the manner described hereinabove. The motor drives the rheostat through a set of speed reduction gears 188, through which it also drives a limit switch actuator 190. The actuator will operate one of a pair of limt switches 192 and 194 in the event that the vernier rheostat should be driven to a point near one of its limits of rotation.

The motor 186 is a two-phase servo motor having a pair of windings 196 and 198 connected at one end to the common line 80 of the A.C. power source 76. The application of power to these windings may be controlled either by manual or automatic means, depending on the condition of contacts 242a–d of a motor relay 242 whose function will be more fully described hereinafter. With the relay contacts as shown, motor operation is adapted to be controlled by the contacts 174a and 176a of the output relays 174 and 176. Thus if relay 174 is operated, closing its contacts 174a, a circuit is completed from line 78 through contacts 174a, 242a and the limit switch 192 through winding 196 to line 80. Power is also applied to winding 198 through resistor 200 and capacitor 202 whereby the voltage across winding 198 is shifted out of phase with the voltage across winding 196, causing the motor 186 to run in one direction. In a similar manner, if contacts 176a close instead of contacts 174a, winding 198 receives voltage from line 78 directly while winding 196 is energized through the phasing network, causing the motor 186 to run in the other direction. Rotation of the motor in either direction causes the limit switch actuator 190 to be driven toward that limit switch which is carrying power to the motor. It is apparent that actuation of the limit switch will automatically reverse the motor, returning the vernier rheostat and the actuator 190 to the operating range.

It is seen that the servo motor 186 drives a tachometer generator 204 which produces a D.C. voltage having a polarity in accordance with its direction of rotation and a magnitude proportional to its speed. The tachometer voltage appears across the voltage divider combination of resistor 206 and potentiometer 208 whereby a desired portion thereof may be impressed on one contact 210 of the chopper section 140b in opposition to the error signal appearing on the other contact 212. Thus the square wave component of voltage appearing on the vibrating contact of the chopper is the algebraic sum (usually the absolute difference) of the error signal and the correction rate signal.

The servo amplifier 162 is designed to have an almost infinite forward gain so as to saturate on a very small input signal, so that ordinarily one or the other of the output relays 174 and 176 will be energized at all times. If the error voltage across resistor 156, representing an error in the thickness of the strip 10, has a certain polarity, the servo motor 186 will be driven with full acceleration in one direction. The motor will continue to accelerate until the tachometer voltage appearing on contact 210 of the chopper becomes equal and opposite to the error signal, at which time the input to the servo amplifier approaches zero. At any greater speed the rate feedback voltage would become larger than the error signal, so that the input to the servo amplifier would be of opposite phase, energizing the servo motor to drive in the opposite direction. It can be seen that by this means in essence the speed of the servo motor and the rate of readjustment of the vernier rheostat 32 is maintained instantaneously proportional to the magnitude and direction of the error in the strip thickness. Therefore, over any given period of time, the total amount of readjustment applied to the vernier rheostat is substantially proportional to the time integral of the error signal received over the same period of time.

The rate of correction to the vernier rheostat per percent of error is referred to as the "gain" of the control system. The maximum available gain is dependent on the ratio selected for the speed reduction gears 188. The gain is variable over a suitable range by adjusting the gain control knob 214 coupled to potentiometer 208 which determines the portion of the tachometer voltage which is fed back to cancel the error signal. Potentiometer 208 therefore determines the speed of the servo motor which will be maintained for a given amount of error in strip thickness.

The maximum permissible gain is definitely limited by transportation lag, that is, the length of time required for a point on the moving strip to travel from the nip of rolls 14 to the gauging head comprising the source 60 and the detector 62. If the gain is set too high, an existing error will be overcorrected before the gauge is able to "see" that sufficient correction has already been applied. Hence the mill speed, the tension on the strip and the output thickness thereof are caused to "cycle" or perform forced oscillations around the desired value. On the other hand, it is desirable to keep the gain as high as possible to secure optimum performance from the controller.

In addition to transportation lag, there are appreciable delays of the inertial type associated with the transfer function of the mill speed control, due to the highly inductive nature of the mill motor field circuits and the mechanical inertia of the motor armature and other dynamic elements of the mill. Such factors prevent instantaneous change in the thickness of the output strip 10 in response to a change in the setting of the vernier rheostat. These delays are compensated by a forcing method implemented by the phase lead network of resistors 154 and 156 and capacitor 158. Thus a constant error signal is divided by resistors 154 and 156 so that the portion of the signal appearing across resistor 154 is not available as an input to the velocity servo. That is, the actual working error signal comprises only that portion of the amplified and filtered D.C. voltage which appears across resistor 156. However, if there is a rapid change in the value of the error voltage, the potential change is bypassed around resistor 154 through capacitor 158, thus generating a time derivative of the working error voltage which is added to the working error voltage so that a signal approaching the gross error voltage appears momentarily across resistor 156 as an input to the servo system. As a result, the controller momentarily observes and attempts to correct for a larger error than actually exists in the measured strip thickness. The extra signal voltage may then decay according to the time constant of the lead network, so that the overadjustment of the vernier rheostat effected by the action thereof may be corrected when the error voltage reaches a steady state value.

It is seen that the output shaft of the gear box 188, which is coupled to the vernier rheostat 32 and the limit switch actuator 190, is also coupled to the rotor 216 of a synchro control transmitter 218. The transmitter 218 is connected to a receiver 220, remotely located in the operator's station, whose rotor 222 is linked to an indicator 224 which repeats the angular position of the vernier rheostat.

The vernier rheostat control system has three modes of operation; manual control, automatic control, and automatic reset; the particular mode prevailing at any time being dependent on the condition of relays 228, 230, 232, 234, 236, 238, 240 and 242.

The automatic reset mode of operation may be initiated when a signal from the mill indicates the approaching end of a coil. At this time mill controls may be actuated to decelerate the mill to threading speed, and simultaneously close a set of switch contacts 244, energizing a "mill run relay" 228 whose contacts 228a are utilized to energize the reset relay 232 through the normally closed contacts 230a of a time delay relay 230. Contacts 232a of the reset relay disconnect the input of amplifier stage 134 from the compensated error voltage being fed thereto and contacts 232b connect the same to a reset voltage obtained from one-half of the low voltage winding 142a on transformer 142, which winding has its center tap connected to the grounded common line 80. The phase of the reset voltage is such that the controller will drive the vernier rheostat 32 to the counter-clockwise (low speed) limit. On reaching the limit, the actuator 190 will strike reversing switch 192. It is seen that the action of the limit switch will cause the vernier rheostat to oscillate rapidly in the vicinity of the limit, as the reversing switch is alternately operated and released. This oscillation occurs too rapidly to effect the mill speed.

The entire resetting operation requires only a few seconds, whereupon the time delay relay 230 (which was energized simultaneously with the reset relay 232 by closure of contacts 228a of mill run relay 228) now opens its contacts 230a, thus de-energizing the reset relay 232. Meanwhile, the deceleration of the mill has resulted in a decreased output from the mill tachometer 52, de-energizing the relay 54, whose contacts 54a reclose, energizing the speed relay 234. Contacts 234a of the speed relay remove power from the time delay relay 238. Contacts 234b and 234c of the speed relay are now closed, so that as soon as the reset relay 232 is de-energized, the automatic-manual relay 240 and the motor relay 242 are both energized through contacts 234b and contacts 232c of the reset relay. A parallel circuit is also established by closure of the contacts 240a of the automatic-manual relay, through a normally closed pushbutton switch 250, contacts 234c and 240a.

Referring to the switching circuits asociated with the servo motor 186, it is seen that contacts 242a and 242c of the motor relay are now open, whereas contacts 242b and 242d are closed. Automatic control is therefore discontinued, since the circuits through the contacts 174a and 176a of the controller output relays are open. The operator may control the position of the vernier rheostat 32 manually, using the increase speed switch 252 or the decrease speed switch 254. Contacts 252a or 254a of these switches when operated will now apply power to the servo motor 186. This power is derived from the variable tap of an auto-transformer 256 which reduces the line voltage so that the servo motor will operate at a slower speed for purposes of manual control.

When the mill has been threaded, the mill controls are actuated to accelerate the mill to running speed, and simultaneously open the switch 244. The mill run relay 228 is de-energized and its contacts 228a remove power from the time delay relay 230. When the mill has reached a predetermined speed depending on the setting of the contact 56 of the speed indicator 50, the relay 54 will be energized. Its contacts 54a will open, de-energizing the speed relay 234. Contacts 234a will now close, applying power to the time delay relay 238, whose contacts 238a, however, do not close immediately. This allows relays 240 and 242 to be de-energized when contacts 234b and 234c of the speed relay reopen. It is seen that automatic control of the vernier rheostat is now in effect.

Shortly after the controller mode is thus automatically transferred to automatic operation, the contacts 238a of the time delay relay 238 will close. This permits the controller to revert to manual operation in the event that an abnormal condition should arise in the rolling of a coil. For example, a plurality of safety devices are normally employed to monitor the operation of the measuring instrument 64 and the error signals derived from its measurement. Any number of such safeties or mill safeties may be utilized to actuate normally open contacts in the safeties circuit indicated at 260. It is seen that the tension relay contacts 236a and contacts 252b and 254b of the manually operated increase and decrease speed switches are also in parallel with the safeties contacts. Closure of any of these contacts will energize the automatic manual relay 240, whose contacts 240a will establish a holding circuit for its coil through the "automatic" pushbutton 250 and contacts 238a of time delay relay 238. Accordingly the controller operation will remain in the manual mode until the holding circuit is broken by means of the "automatic" pushbutton 250.

While the invention has been described and illustrated in a specific embodiment wherein it is evident that the objects of the invention have been accomplished, it is also evident that a great many changes and modifications can be made in the disclosed apparatus without any departure from the essential principles of the invention. It must be clearly understood therefore that the particular means herein shown and described are to be considered illustrative only and not restrictive to the scope of the invention as is set forth in the appended claims.

What is claimed is:

1. In the combination of a rolling mill and like apparatus wherein an elongated workpiece of ductile material is passed in succession through first and second machine elements in tractive engagement with said workpiece for reducing a cross-sectional dimension of the same, said apparatus including means for driving said second machine element and adjustable means for regulating the speed of said driving means, with means for measuring said dimension and means controlled by said measuring means for actuating said speed regulating means, the improvement comprising: a radioactive source of penetrative radiation and a radiation detector positioned near the material exit side of said second machine element for producing an indication of the measured value of said cross-sectional dimension of said workpiece issuing from said second machine element, target setting means permitting selection and indication of a desired value of said dimension, means responsive to any deviation of said measured value indication from said desired value indication for producing a first electrical signal functional of said deviation, circuit means having a variable element coupled to said target setting means for converting the absolute value of the deviation-functional characteristic of said first electrical signal into a value proportional to the percentage deviation of said measured value indication from said desired value indication to provide a compensated error signal, an electronic amplifier having an input and an output, means for connecting said error signal to said amplifier input, motor means controlled by said amplifier output for actuating said adjustable means for regulating the speed of said driving means, means driven by said motor means for producing a second electrical signal proportional to the speed thereof, and adjustable means for connecting said second electrical signal to said amplifier input in opposition to said error signal.

2. In the combination of a rolling mill and like apparatus wherein an elongated workpiece of ductile material is passed in succession through first and second machine elements in tractive engagement with said workpiece for reducing a cross-sectional dimension of the same, said apparatus including means for driving said second machine element and adjustable means for regulating the speed of said driving means, with means for measuring said dimension and means controlled by said measuring means for actuating said speed regulating means, the improvement comprising: a radioactive source of penetrative radiation and a radiation detector positioned near the material exit side of said second machine element for producing an indication of the measured value of said cross-sectional dimension of said workpiece issuing from said second machine element, target setting means permitting selection and indication of a desired value of said dimension, means responsive to any deviation of said measured value indication from said desired value indication for producing a first electrical signal voltage functional of said deviation, compensating circuit means having a variable element coupled to said target setting means for converting the absolute value of the deviation-functional characteristic of said first electrical signal into a value proportional to the percentage deviation of said measured value indication from said desired value indication to provide a compensated error signal, circuit means for generating a voltage equal to a time derivative of said compensated signal and for adding the same to a portion of said compensated signal to produce a control signal, an electronic amplifier having an input and an output, means for connecting said control signal to said amplifier input, motor means controlled by said amplifier output for actuating said adjustable means for regulating the speed of said driving means, means driven by said motor means for producing a second electrical signal proportional to the speed thereof, and adjustable means for connecting said second electrical signal to said amplifier input in position to said control signal.

3. The improvement of claim 2 wherein said compensating circuit means comprises a voltage divider for said first signal voltage, a plurality of fixed taps on said voltage divider, an amplifier having an input and an output, a range switch connecting said amplifier input to one of said taps selected by said switch, a potentiometer connected to the output of said last-mentioned amplifier, a variable tap on said potentiometer, and mechanical means connecting said variable tap to said target setting means.

4. In the combination of a rolling mill and like apparatus wherein an elongated workpiece of ductile material is passed in succession through first and second machine elements in tractive engagement with said workpiece for reducing a cross-sectional dimension of the same, with means for measuring said cross-sectional dimension and means controlled by said measuring means for adjusting the value thereof, and wherein said apparatus includes a mill motor for driving said second machine element, said mill motor having an armature circuit and a field circuit; means for energizing said armature circuit from a power source, generator means connected to said field circuit for exciting the same, and a rheostat for adjusting the output of said generator means, the improvement comprising: means including a radioactive source of penetrative radiation and a radiation detector positioned near the material exit side of said second machine element for producing an indication of the measured value of said cross-sectional dimension of said workpiece issuing from said second machine element, target setting means permitting selection and indication of a desired value of said dimension, means responsive to any deviation of said measured value indication from said desired value indication for producing a first electrical signal functional of said deviation, circuit means having a variable element coupled to said target setting means for converting the absolute value of the deviation-functional characteristic of said first electrical signal into a value proportional to the percentage deviation of said measured value indication from said desired value indication to provide a compensated error signal voltage, circuit means for generating a voltage equal to a time derivative of said compensated signal voltage and for adding the same to a portion of said compensated signal voltage to produce a control signal, an electronic amplifier having an input and an output, means for connecting said control signal to said amplifier input, a servo motor controlled by said amplifier output for actuating said rheostat to regulate the speed of said mill motor, means driven by said servo motor for producing a second electrical signal proportional to the speed thereof, and adjustable means for connecting said second electrical signal to said amplifier input in opposition to said control signal.

References Cited in the file of this patent
UNITED STATES PATENTS

| | | |
|---|---|---|
| 2,273,714 | Lessmann | Feb. 17, 1942 |
| 2,281,083 | Stoltz | Apr. 28, 1942 |
| 2,295,399 | Hanna | Sept. 8, 1942 |
| 2,565,734 | Lundahl | Aug. 28, 1951 |
| 2,653,247 | Lundahl | Sept. 22, 1953 |
| 2,660,077 | McCauley et al. | Nov. 24, 1953 |
| 2,790,945 | Chope | Apr. 30, 1957 |
| 2,883,895 | Vossberg | Apr. 28, 1959 |

OTHER REFERENCES

Automation, pp. 52–57, March 1956.